April 12, 1960 D. E. WEISS ET AL 2,932,552
EXTRACTION OF URANIUM

Filed Jan. 3, 1956 2 Sheets-Sheet 1

April 12, 1960 D. E. WEISS ET AL 2,932,552
EXTRACTION OF URANIUM
Filed Jan. 3, 1956 2 Sheets-Sheet 2
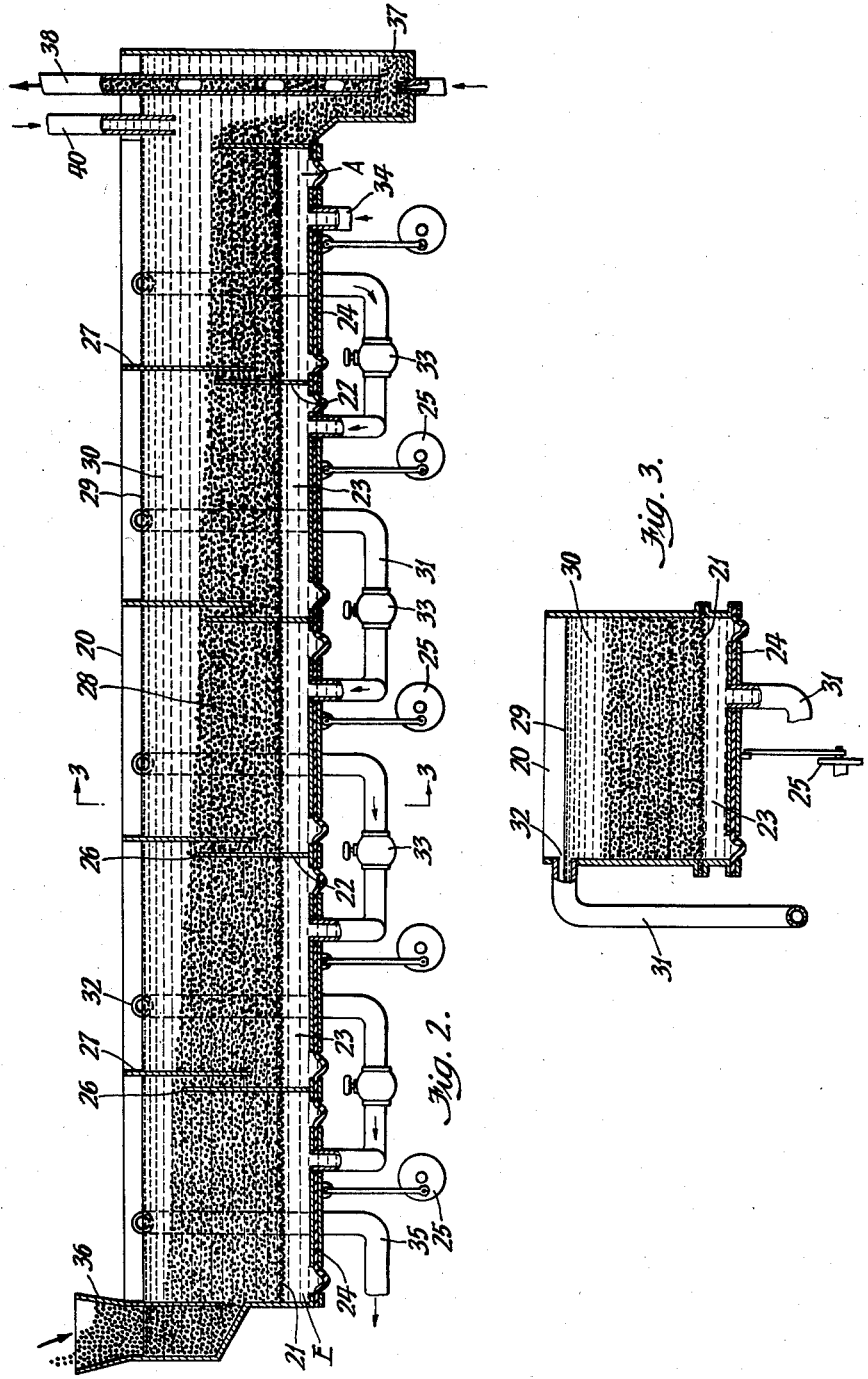

United States Patent Office 2,932,552
Patented Apr. 12, 1960

2,932,552

EXTRACTION OF URANIUM

Donald Eric Weiss, Blackburn, and Everard Arthur Swinton, Mount Eliza, Victoria, Australia, assignors to Commonwealth Scientific and Industrial Research Organization, East Melbourne, Victoria, Australia, a corporation Application January 3, 1956, Serial No. 557,200

Claims priority, application Australia March 4, 1955

2 Claims. (Cl. 23—14.5)

This invention relates to a method for continuously extracting uranium from a leach liquor, or from a suspension of finely divided solids in a leach liquor, utilizing an ion exchange technique.

Uranium is present in a number of its ores in relatively low concentration, but it can be leached out of the crushed or ground ore in most cases by treatment with acid. The recovery and rough purification of the uranium from the ensuing solution is often carried out by means of ion exchange. The preferred and usual method of operation is to filter the leach pulp to give a clear solution, and to pass this solution down through a relatively deep bed of a suitable anion exchange resin, in a vessel provided with a screen or sand bed to retain the resin. At first, ion exchange takes place in the top layer of the bed, uranium being taken up on the resin as a complex anion, and cationic impurities passing through the column and out in the effluent. This reaction takes place at any one time through a certain depth of bed, termed the reaction zone. As the top layer of resin begins to attain saturation, the reaction zone moves progressively down the column, and when the leading fringe of the zone reaches the bottom of the column, the uranium leaks into the effluent. This is termed the "breakthrough point," but operation is usually continued until the leakage attains economic proportions. The flow of solution is then transferred to another column and the first column backwashed by an upward flow of water or dilute acid. Uranium is then stripped from the resin by a downward flow of an eluant, the resin rinsed, and the regenerated column used in a further adsorption cycle. Uranium is recovered from the main runnings of the eluant by chemical precipitation, the fore- and end-runnings being used for further cycles.

For efficient operation, the flow rate during both the loading and elution cycles should be such that a shallow reaction zone progresses evenly through the bed. In order to reduce the frequency of regeneration, it is usual to install a deep bed of resin, with sufficient capacity, for, say, eight hours running. Under these conditions, a large proportion of the resin at any one time is either waiting to be contacted with uranium-bearing solution, or waiting, fully loaded, until the whole of the bed is saturated before it can be regenerated. This represents an uneconomic utilisation of expensive materials, and it would obviously be desirable to continuously remove resin which was ready for regeneration, and replace it with fresh resin.

Processes have been described in which compact beds of resin move slowly down a column against a rising stream of liquid and are removed at the base of the column by means of star valves, rotary dewatering valves, or liquid ejectors, resin being fed in by gravity at the top of the column.

However, difficulties associated with the design of a satisfactory resin outlet system for a large scale unit, which will minimise attrition of the resin, and provide adequate flow distribution, limit the industrial application of such processes.

The compact bed method of using ion exchange resins has an important limitation insofar as the liquid feed to the ion exchange column must be substantially free of suspended solid matter, otherwise the matter is filtered out on the top of the resin bed, leading firstly to severe channelling, and eventually to blockage of the column. Minor quantities of solid can usually be tolerated, as they are removed at the end of each cycle by the backwash, but according to the technique at present in use, it is impracticable to pass a slurry through a resin bed, and it is therefore necessary to clarify the liquor beforehand by means of a preliminary filtration. This prefiltration is in most cases expensive, and in some cases prohibitively difficult. An example of this is in the leaching of some ore bodies, where the presence of clays or slimes renders the filtration almost impossible.

A process has been described whereby a bed of ion exchange resin is maintained in a completely fluidized state by flowing the liquid to be treated up through the bed at certain velocities. This method enables slurries as well as clear solutions to be treated, and also enables the process to be made continuous insofar as resin can be continuously added and removed. In some particular cases, where the resin becomes more dense as it takes up the adsorbable ion, a degree of countercurrent action is obtained since the denser resin tends to segregate to the base of the fluidized bed, where it is withdrawn. However, in a completely fluidized bed, there is considerable turbulence and consequent short-circuiting both of liquid and solid, and where it is necessary to obtain efficient countercurrent action, a number of such cells must be used with interstage liquid and solid transfer devices. A tower divided into compartments has been proposed, but in all processes employing a fluidized bed, the maximum and minimum liquid flow rates are critically dependent on the sedimentation velocity of the adsorbent particles.

The object of this invention is accordingly to provide an improved method for continuously extracting uranium from a leach solution, or from the liquid of a desanded leach pulp, containing uranium in the dissolved state, by means of a moving bed of ion exchange resin, at practical flow rates, and in an efficient manner such that the desired degree of countercurrent contact is obtained in a unit containing a minimum quantity of ion exchange resin, and such that liquid and solid short-circuiting is reduced.

A further object is to provide a method for continuously eluting uranium from loaded resin, and returning regenerated resin to the loading unit, under like conditions.

A method in accordance with this invention, of continuously extracting uranium from a liquid containing uranium in the dissolved state, comprises passing a flow of the liquid up through a relatively deep bed of ion exchange resin retained in a column in an adsorption unit between two perforated screens, the flow being pulsated so that it is momentarily reversed at each pulsation, removing barren liquid at the top of the column, withdrawing a slurry of loaded resin and liquid from the base of the bed, separating the loaded resin from the slurry, passing the loaded resin into an elution unit where the resin is contacted countercurrently with a stream of eluant to strip the uranium from the resin, feeding the regenerated resin back to the column, and treating the eluate for the recovery of uranium.

More particularly, a method in accordance with the invention may comprise passing a flow of the liquid up through a relatively deep bed of ion exchange resin retained in a column in an adsorption unit between two perforated screens, the flow being pulsated so that it is momentarily reversed at each pulsation, removing barren liquid at the top of the column, withdrawing a slurry of loaded resin and liquid from the base of the bed, passing the loaded resin into an elution unit to contact the resin in a series of intercommunicating cells with a pulsating rising flow of eluant, the resin being maintained as a semi-fluidized bed in each cell and flowing from one cell to the next by its own hydrostatic head and the eluate being transferred from one cell to another countercurrently to the flow of resin, the eluate ultimately leaving the elution unit and being treated for the recovery of uranium, the regenerated resin being fed from the elution unit back into the adsorption unit. Normally, the regenerated resin will be separated from the eluant before being fed back into the adsorption unit.

It is of great practical importance that the invention provides a method whereby it is possible to treat a suspension of finely divided particles, such as a desanded, but unfiltered, leach pulp.

A feature of the invention lies in the segregation of uranium-loaded resin at the base of a pulsated semi-fluidized bed which enhances countercurrent action in the adsorption unit, and also in the elution unit if it is designed so that only resin from the top of each cell is passed on to the base of the next cell.

Having described the general nature and objects of the invention, a more detailed description of one particular process in accordance therewith for extracting uranium from a desanded leach pulp will now be given with reference to the accompanying drawings, in which:

Figure 2 is an enlarged view of the elution unit in sectional side elevation, and Figure 3 is a view through the apparatus in transverse cross-section taken on the line 3—3 in Figure 2.

Figure 1:
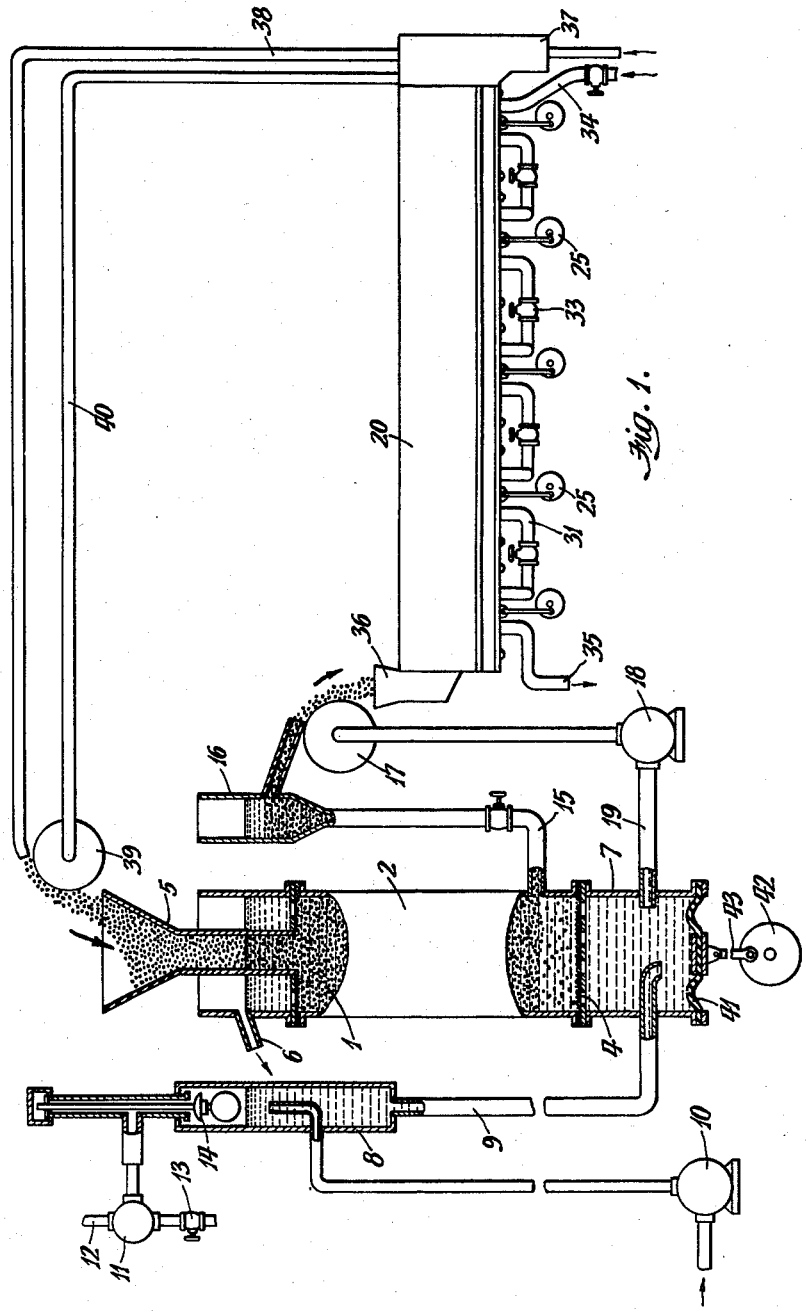
Figure 1 is a schematic view in part-sectional side elevation of adsorption and elution units arranged in accordance with the invention.

As shown in the drawings and referring firstly to the adsorption unit, a bed of anion-exchange resin beads 1 of size range greater than 36 mesh is retained in a column in a cylindrical rubber-lined shell 2 between upper and lower horizontal perforated screens 3, 4 respectively, the apertures in these screens being less than the minimum size of the resin beads being used. The upper perforated screen 3 is pierced by a hopper 5 of suitable dimensions which extends to the level of the screen 3. A liquor outlet pipe 6 is provided above the upper screen 3 and below the upper end of the hopper 5. Below the lower screen 4, the shell 2 is terminated in a lower compartment 7, a head tank 8 being connected to the lower compartment through a wide bore pipe 9. The base of the lower compartment is fitted with a diaphragm 41 which is driven by means of an eccentric 42 through a connecting rod 43.

The desanded leach pulp from which the uranium is to be extracted, is pumped to the head tank 8 by means of a positive pump 10. The top of the tank is connected by a rotary or slide valve 11 alternately to a source of vacuum through a pipe 12 and to a vacuum release air-bleed valve 13 and the arrangement is such that the liquor level in the tank is substantially above that in the main column. A float valve 14 at the top of the head tank 8 guards the vacuum system against inrush of liquor.

A little above the lower screen 4, a relatively narrow outlet pipe 15 passes into the base of the bed 1 and rises outside the apparatus to connect with a surge tank 16 which extends to a height a little above the liquor outlet pipe 6. The liquor discharges from the surge tank into a suitable filter, strainer, or dewatering device 17 fitted with a filtrate return pump 18, the latter communicating by means of pipe 19 with the lower compartment 7. Alternatively the return pump 18 can be arranged to return the filtrate liquor to an earlier stage in the process such as the leach pulp preparation stage.

In operation, liquor to be contacted with the resin is fed in a series of pulsations from the head tank 8 as hereinafter described and passes up through the bed of resin beads 1 at such a flow rate that the bed is lifted against the upper screen 3. The pulsating flow of liquor maintains the bed 1 in a semi-fluidized state such that the flow of resin down the column is facilitated and channelling is reduced by the constant redistribution of the bed. The semi-fluidizing of the bed also enables the liquor, which comprises a slurry of finely divided solids in a solution, to pass through the bed without causing a blockage. Also, because uranium-loaded resin has a much higher density than unloaded resin, the semi-fluidized condition of the bed promotes segregation of heavier resin to the base of the bed, thus favouring the countercurrent action of the unit.

The rate of vacuum release in the head tank 8 is controlled by the valve 13, thus enabling an asymmetric pulse to be applied to the liquor being fed to the base of the main column through pipe 9, that is to say, a sudden application of vacuum giving a rapid surge downwards in the main column to expand the floating bed 1 and causing it to be pulled down a short distance from the upper screen. Resin is thereby drawn into the bed 1 through the hopper 5 until the air-bleed valve 13 is opened to cause a steady resumption of flow of liquor up through the bed. The latter is thus recompacted against the upper screen and any substantial regress of resin into the hopper is prevented. The diaphragm is used to superimpose pulsations at a higher frequency on the resin bed in order to keep the bed in a suitable state of semi-fluidization. The function of the slower pulse cycle imparted by the vacuum system is primarily to facilitate the feeding of resin to the column in the presence of heavy pulps of a specific gravity of 1.3 or greater. The optimum frequency and amplitude of the pulsations are dependent on the particular properties of the liquor or pulp and of the resin and can be adjusted as required. A typical setting is an amplitude of $\frac{1}{4}$–$\frac{1}{2}$ inch for the vacuum pulse at the rate of 5–10 per minute with simultaneous pulses of $\frac{1}{8}$–$\frac{1}{4}$ inch amplitude at the rate of 100–150 cycles per minute applied by the diaphragm. The use of the latter rapid pulse is desirable but not essential.

Loaded resin from the base of the bed is removed by entrainment in a stream of liquor which flows out from the column at this point and up through the pipe 15 to the surge tank 16 from which it overflows at a point a little below the liquor level in the column into the filter 17. Adjustment of this head enables the resin to be carried in a suitable flow. Alternatively resin may be removed from the surge tank by means of an air lift or ejector.

It is essential that free air bubbles be removed from the liquor entering the adsorption unit to prevent choking of the bed of resin.

The slurry of resin and liquor is delivered on to the moving screen of the filter which strains off the resin, allowing the liquor to be recirculated back to the column, the resin being rinsed on the screen and then discharged into a hopper feeding the regeneration, or elution, unit.

The latter, which is of the type described in our United States Letters Patent No. 2,765,913, comprises a long rectangular vessel 20 open at the top and divided horizontally by a perforated screen 21 having apertures therein of a size smaller than the resin beads fed into the vessel. Beneath the screen 21, the vessel is divided by transverse partitions 22 to form a series of lower compartments 23, each fitted and sealed at its base with a diaphragm 24 which can be reciprocated, as by the eccentrics 25.

Above the screen 21, the vessel is dividedly transverse vertical partitions 26 which extend upwardly from the level of the perforated screen 21. Corresponding partitions 27 extend from the top of the vessel nearly down to the perforated screen 21, overlapping the partitions 26 but being spaced longitudinally from them, the whole system dividing the vessel above the perforated screen into a series of upper compartments which intercommunicate through labyrinths. The upper and lower compartments approximately register with each other to form a series of cells.

The resin forms a bed 28 above the perforated screen 21, and is immersed in the eluant 29, the resin being retained in each upper compartment by the transverse partitions 26, leaving a zone of clear liquid 30 above the bed in each cell. Weir pipes 31 having inlet ports 32 provide paths for liquid communication between the upper compartment of one cell and the lower compartment of the next, the liquid passing in each case through non-return valves 33.

The eluant 29 is pulsated up and down through the bed by means of the diaphragm 24 in each cell. Fresh eluant is fed into the base of the first cell A through inlet pipe 34 and a corresponding amount of eluant is pumped from the supernatant zone of each cell into the base of the succeeding cell through the weir pipes 31, the liquid from the final cell E overflowing through the outlet weir pipe 35.

Due to the influence of the pulsations, and of the rising liquid stream through each cell, the bed of resin in each cell is maintained in a semi-fluidized condition and will flow in much the same way as a layer of heavy viscous liquid. Thus, when loaded resin is fed from the filter 17 into the cell E of the apparatus through a hopper 36, a corresponding amount of resin overflows each of the transverse partitions 26, flows down through the labyrinth, and under the partitions 27 into the succeeding cell. Resin from the first cell A will thus overflow the last transverse partition 26 and fall into a sump 37 from which it is elevated by an air lift 38 or other convenient means. The segregation of resin according to density which takes place in each cell ensures that only resin which has had some of its uranium content eluted is passed on to the next cell, though the flow in each cell itself does not possess the countercurrent action which is utilised in the loading unit.

The stripped resin which thus falls into the sump, is then delivered to a dewatering screen 39 (see Figure 1), from which the carrier liquid, and any make-up liquid, is recycled back to the sump through a pipe 40. The dewatered resin from the screen 39 discharges into the hopper 5.

It may, in some cases, be advantageous to rinse the resin on the moving screen, or to utilise one or two cells of the elution unit as a rinse section, the effluent rinse mixing with fresh eluant, which is fed to the second or third cell.

The transfer of eluant from one cell to the next is performed by the action of the pulsating diaphragms. Because of the presence of the non-return valves 33 in the over-flow weir pipes 31, a small suction head develops in each pipe, due to the imperfect ball-valve action of the bed of solid particles.

In an alternative arrangement, positive control over the inter-cell liquid transfer is obtained by using a simple bucket wheel or other adjustable positive pump for each transfer instead of the non-return valves 33.

The following example illustrates the principles of the invention:

A leach pump containing 1.5 grams per litre of uranium oxide and 15% by weight of slimy ore solids was continuously passed upwardly through the column of an adsorption unit which consisted of a glass pipe 12 inches in diameter and 3 feet 6 inches long. The upper and lower screens were made of coarsely perforated plastic sheets, ⅜ inch thick, covered on the underside with woven nylon mesh, equivalent to 36 mesh standard screen. The column contained a bed 3 feet deep of Amberlite XE123 ion-exchange resin (Amberlite being the trademark of Rohm & Haas Co. of Philadelphia), of bead size 10–30 mesh. The upper screen was pierced by a cylinder 4 inches in diameter and 18 inches high. The compartment under the lower screen contained a diaphragm 9 inches in diameter which was driven by a rotating cam and the pulp feed pipe, which led from a standpipe, was fed by a positive metering pump. The resin and pulp off-take consisted of a 2 inch branch near the base of the column above the lower screen, from which a ¾ inch pipe, 4 feet long, led into an airlift sump from which the slurry of resin and pulp was elevated on to a semi-continuous strainer. The filtrate from this strainer was returned to the column feed section, while the resin was rinsed and passed into a continuous eluting apparatus.

This latter apparatus consisted of a rubber-lined mild steel tank divided by transverse partitions as previously described to form six cells each 9 inches square and 1 foot deep. A bed of resin averaging 2 inches deep was retained on the horizontal perforated screen above a bed 1 inch deep of 20–30 mesh quartz sand which acted as a flow distributor. Resin from this eluting apparatus was fed back into the hopper tube piercing the upper screen in the adsorption unit.

In operation, a flow of 1 gallon per sq. ft. per minute of the pulp was passed up the column in the adsorption unit, thus entraining the bed of resin against the upper screen. Fresh resin was fed to the column at a rate of 200 mls. per minute of wet settled resin and an equivalent amount of loaded resin was continuously removed from the base of the loaded bed by the means described. Pulsations of amplitude ¼ to ½ inch, at a rate of between 50 and 150 strokes per minute, were applied to the flow by means of the diaphragm and maintained the bed in a semi-fluidized condition.

The barren pulp overflowing the column was analysed, the maximum leakage being found to be only 2% of the feed concentration. The resin being withdrawn from the bottom of the bed was loaded to an average of 30 grams of uranium per litre of wet settled bed.

1600 mls. per minute of an eluant solution containing 1 N sodium chloride and ⅒ N sulphuric acid was passed through the eluting apparatus countercurrently to the flow of 200 mls. per minute of wet settled resin. An eluate containing 4 grams per litre of uranium oxide was produced which was delivered to a uranium precipitation unit. The resin was almost completely regenerated and was returned to the top of the column.

It is thus apparent that this invention will provide a highly efficient method for continuously extracting uranium from a leach solution or a desanded leach pulp and also for continuously eluting uranium from loaded resin and returning the regenerated resin to use.

We claim:

1. A method of continuously extracting uranium from a liquid containing uranium in the dissolved state comprising passing a flow of the liquid in an upward direction through a substantially compact bed of anion-exchange resin in the form of beads of size range between 10 and 30 mesh disposed below a substantially horizontal perforated screen while completely immersing said bed in said flow, the flow rate of said liquid being higher than the sedimentation velocity of the bulk of the resin in said liquid whereby the bulk of said bed is retained against the lower side of the perforated screen, feeding in eluted resin to the top of the bed through an opening in the screen, maintaining a head of resin in communication with said opening to a height above the highest liquid level in the column, pulsating said flow at a frequency and at an amplitude such that said bed is momentarily expanded during a portion of each pulse cycle, whereby any finely divided solids in said flow are enabled to progress through said bed, and recompacted during another portion of each pulse cycle so that gross turnover of the bed is avoided and the soluble uranium in said flow is adsorbed on successive zones of the bed, the semi-fluidized condition of the bed thus created promoting segregation of the heavier uranium-loaded resin beads towards the base of the bed, the pulsations also being of such amplitude that during each pulse cycle the upward movement of said flow is reversed and the resin is pulled away from said screen to enable eluted resin to be fed into the space thus created, withdrawing a slurry of uranium-loaded resin beads from adjacent the base of the bed, recovering the loaded resin beads from this slurry, counter-currently contacting the loaded resin with an eluant in a contacting apparatus having a series of successively arranged compartments separated by transverse weir partitions and each provided with a substantially horizontal screen therein, said countercurrent contact being effected by introducing the eluant to the contacting apparatus in the compartment at one end of the latter, withdrawing the eluant from the contacting apparatus at the compartment at the other end of the latter, introducing the resin to said compartment at said other end of the apparatus, withdrawing the resin from the compartment at said one end of the apparatus so that the resin spills past said weir partitions separating the series of compartments and travels through the latter from said other end to said one end of the contacting apparatus, vertically pulsating the eluant in said compartments so that, with each pulsation, eluant passes vertically to and fro through the screen of each compartment and produces a partly fluidized bed of the resin adjacent the screen, and transferring, externally of the compartments, eluant from each compartment to the next adjacent compartment in the direction toward said other end of the contacting apparatus so that, while the eluant moves normal to the direction of movement of the resin through the series of compartments, the overall movement of the eluant, from compartment to compartment through the contacting apparatus, is countercurrent to said direction of movement of the resin, returning the eluted resin to the top of the first-mentioned bed, and treating the eluate for the recovery of uranium.

2. A method as in claim 1, in which the liquid containing uranium in the dissolved state comprises a desanded leach pulp.

References Cited in the file of this patent

UNITED STATES PATENTS

| | | |
|---|---|---|
| 2,709,643 | Peery | May 31, 1955 |
| 2,734,804 | Courthope et al. | Feb. 14, 1956 |
| 2,735,795 | Weiss et al. | Feb. 21, 1956 |
| 2,742,381 | Weiss et al. | Apr. 17, 1956 |
| 2,743,154 | Kaufman et al. | Apr. 24, 1956 |
| 2,743,999 | Binswanger | May 1, 1956 |
| 2,745,888 | Mertes et al. | May 15, 1956 |
| 2,765,913 | Weiss et al. | Oct. 9, 1956 |

UNITED STATES PATENT OFFICE

CERTIFICATE OF CORRECTION

Patent No. 2,932,552                              April 12, 1960

Donald Eric Weiss et al.

It is hereby certified that error appears in the above numbered patent requiring correction and that the said Letters Patent should read as corrected below.

In the heading to the printed specification, line 9, foreign filing date, for "March 4, 1955" read -- January 4, 1955 --.

Signed and sealed this 4th day of October 1960.

(SEAL)

Attest:
KARL H. AXLINE
Attesting Officer

ROBERT C. WATSON
Commissioner of Patents